United States Patent [19]

Heyer

[11] 4,255,365
[45] Mar. 10, 1981

[54] PNEUMATIC GAUGE ADJUSTMENT OF EDGE-PINNED CAST WEB

[75] Inventor: David E. Heyer, Kingston, Ohio

[73] Assignee: E. I. Du Pont de Nemours and Company, Wilmington, Del.

[21] Appl. No.: 5,718

[22] Filed: Jan. 23, 1979

[51] Int. Cl.³ .............................................. B29D 7/02
[52] U.S. Cl. ................................ 264/22; 264/176 R; 264/216; 425/174.8 E
[58] Field of Search ............. 264/22, 216, 556, 210 R, 264/176 R; 425/66, 72 R, 174.8 E, 223, 224

[56] References Cited

U.S. PATENT DOCUMENTS

| Re. 27,771 | 10/1973 | Owens et al. ........................ 264/22 |
| 2,736,066 | 2/1956 | Chren et al. . |
| 3,121,915 | 2/1964 | Heller, Jr. . |
| 3,141,194 | 7/1964 | Jester ................................ 264/216 |
| 3,277,227 | 10/1966 | Kesseler et al. ................... 264/216 |
| 3,423,493 | 1/1969 | Klenk et al. . |
| 3,597,515 | 8/1971 | Widiger ............................. 264/89 |
| 3,686,374 | 8/1972 | Hawkins ............................ 264/22 |
| 3,734,984 | 5/1973 | Hoffman ........................... 264/216 |
| 3,795,474 | 3/1974 | Heyer ................................ 264/216 |
| 3,847,516 | 11/1974 | Hoffman ........................... 425/72 R |
| 3,904,725 | 9/1975 | Husky et al. ...................... 264/22 |
| 4,017,575 | 4/1977 | Heyer ................................ 264/216 |

FOREIGN PATENT DOCUMENTS

| 754984 | 3/1967 | Canada ............................... 264/556 |
| 848852 | 8/1970 | Canada . |
| 45-18228 | 6/1970 | Japan ................................. 264/216 |
| 47-39930 | 10/1972 | Japan ................................. 264/216 |
| 49-30694 | 8/1974 | Japan ................................. 264/216 |
| 52-26539 | 7/1977 | Japan ................................. 264/216 |
| 894147 | 4/1962 | United Kingdom ............... 425/72 R |

Primary Examiner—James B. Lowe

[57] ABSTRACT

A process for promoting uniform thickness in cast webs of thermoplastic material comprising use of variable air forces selectively directed toward a cast web with pinned edges along the line of initial proximity with a quenching surface. Especially useful to mitigate thinning adjacent to the pinned edges.

8 Claims, 6 Drawing Figures

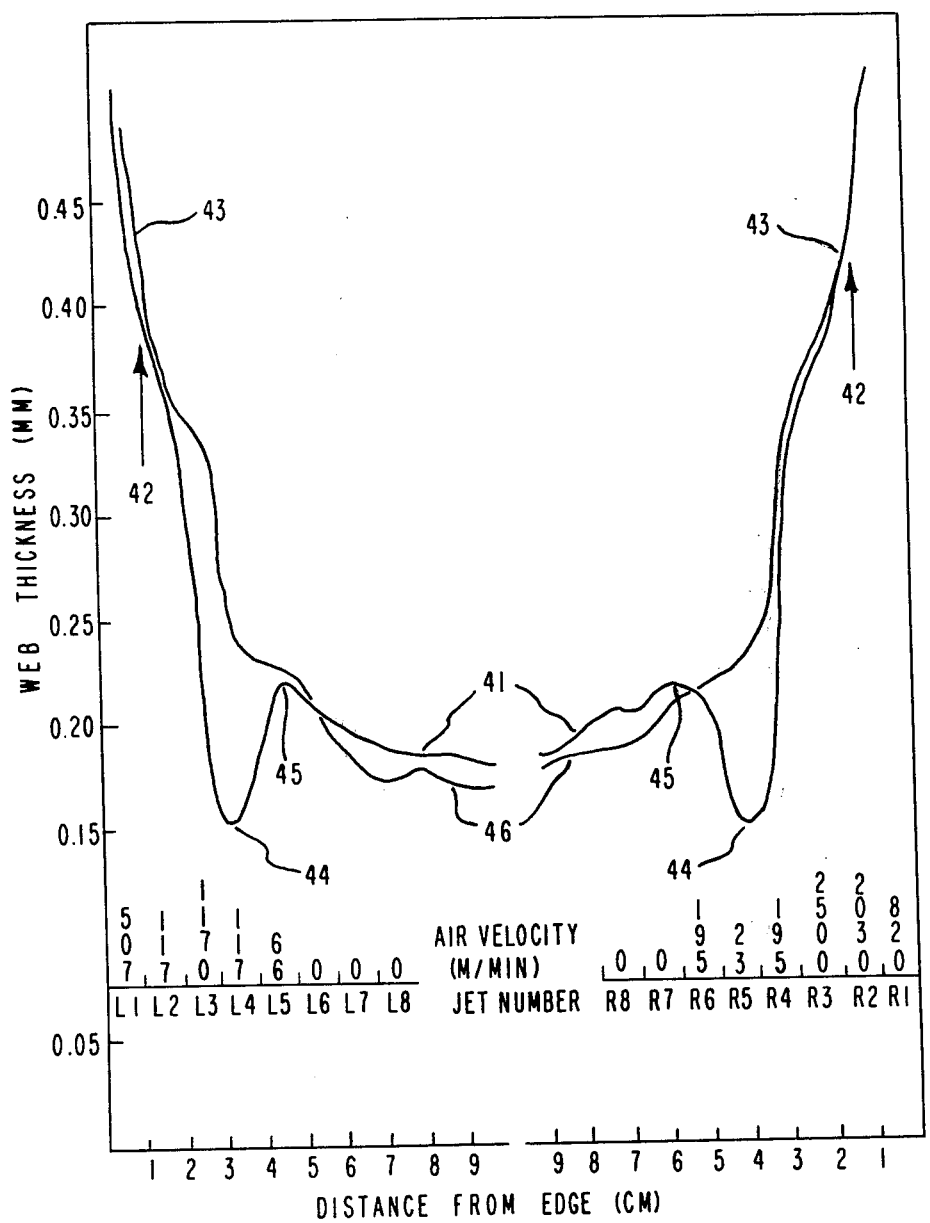

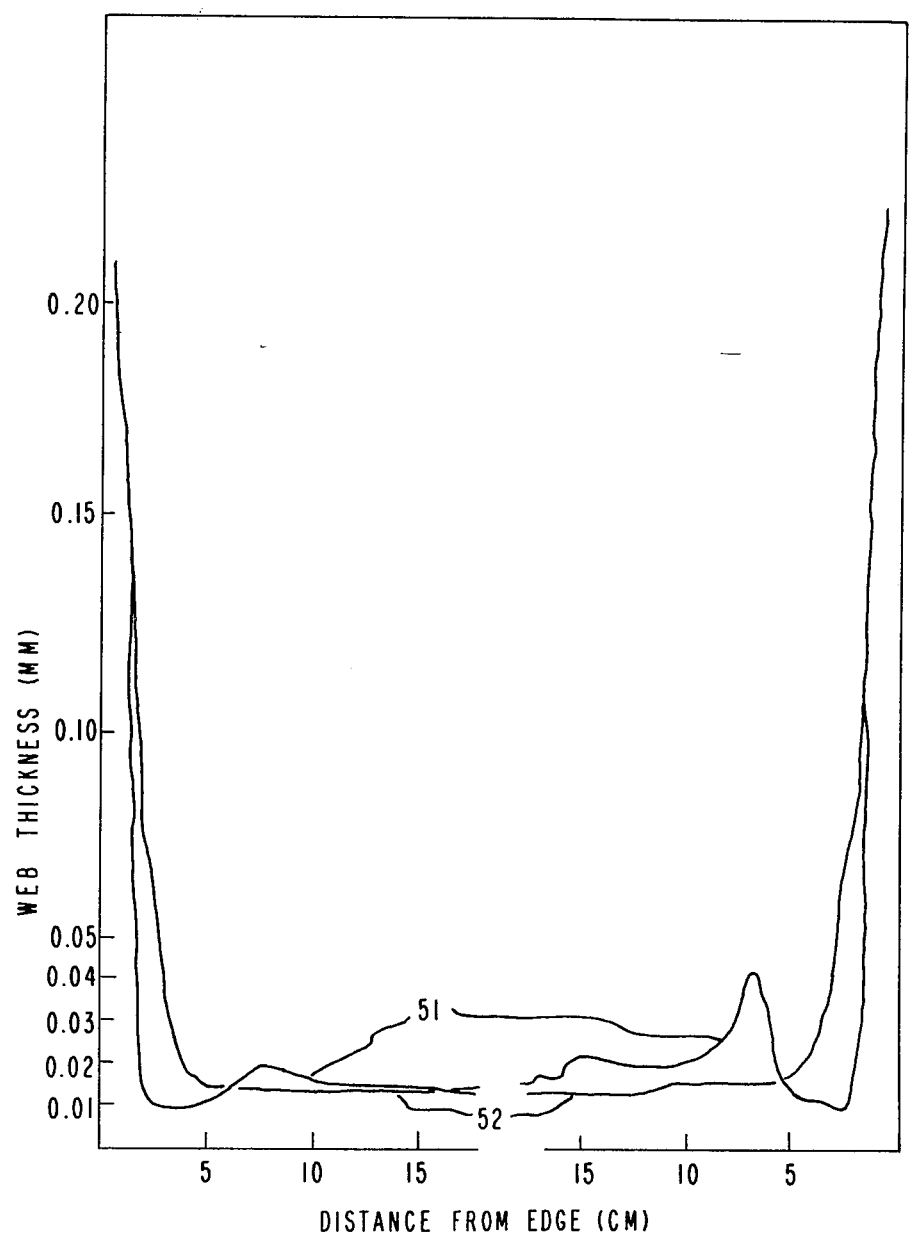

PNEUMATIC GAUGE ADJUSTMENT OF EDGE-PINNED CAST WEB

TECHNICAL FIELD

This invention relates to gauge adjustment of cast webs of thermoplastic material as the webs are cooled by proximity to a moving quenching surface and the web edges are pinned against the quenching surface by electrostatic or other forces. The process of the invention utilizes variable air forces directed toward the cast web before application of the edge pinning, along the line of initial proximity between the cast web and the quenching surface, and exerted at predetermined locations and velocities adequate to alter local web shrinkage, during the quench, to result in a more uniform quenched web thickness. The invention is particularly suited for gauge adjustment of web edges adjacent to the pinning.

PRIOR ART

U.S. Pat. No. 3,597,515 issued Aug. 3, 1971 on the application of Widiger discloses the use of an oscillating air knife to direct a nonuniform air stream against a cast, molten, web of polymeric material applied to a quenching drum. The web of the patent is not pinned at the edges and there are, therefore, no substantial transverse tension forces generated during the quenching. The process of that patent is directed toward causing thickened areas of the unpinned web to migrate from edge to edge across the web and create random gauge nonuniformities in a wound roll, rather than permitting such nonuniformities to remain at the same place, thus causing a thickened longitudinal lane which would result in wound rolls of poor quality.

U.S. Pat. No. 3,904,725, issued Sept. 9, 1975 on the application of Huskey et al. discloses a method for quenching a molten web of polymeric material by means of directing air forces diagonally from an edge of the web across the web and in the direction of web travel after the web has been laid over a quenching drum and its edges have been pinned by electrostatic forces. Gas forces are provided by means of individual, closely-spaced, air jets with a possibility for individual adjustment. Because the air forces are applied after the web has met the quenching drum and been pinned, excessive air can be locally entrained and sealed between the web and the quenching drum. Such locally entrained air acts as an insulator between the web and the quenching drum preventing efficient heat transfer and resulting in some gauge nonuniformities.

Canadian Pat. No. 848,852, issued Aug. 11, 1970 on the application of Roth et al., discloses an arrangement for pinning and quenching a molten web of viscous polymeric material by means of electrostatic forces applied across the web in a line where the web comes into actual contact with a quenching drum followed by application of gas forces uniformly across the web and around the quenching drum extending from the line of web contact to a point of web submersion in a cooling liquid. There is no provision for adjustment of the air forces transversely across the web.

SUMMARY OF THE INVENTION

Thermoplastic material, molten and cast as a web onto a moving quenching surface, has long been pinned to the quenching surface at the lateral edges of the web. Such edge pinning eliminates loss of web width due to shrinkage during the quench and prevents the web edges from wandering on the quenching surface. Because the web edges are pinned during quenching, thus preventing any change in web width, transverse forces are generated across the web and the web is stretched to the extent that it shrinks as it cools. Such stretching occurs at the weakest points on the web including: hot edges directly adjacent to the pinning; web areas of highest temperature; and areas wherein excessive air has been entrained and sealed between the web and the quenching surface thereby reducing the heat transfer between the web and the quenching surface. This invention relates to a process for controlling the temperature of a web by controlling its proximity to the quenching surface which, in turn, controls the areas of the web which will be stretched during the quench and, thus, accomplishes gauge adjustment. This invention relates to a process for affecting a variable force transversely across a molten web to control the local proximity of the web to a quenching surface.

It has been well established that, in processes wherein a molten web is cooled by proximity to a moving quenching surface, the web does not come into actual contact with the quenching surface. In the absence of some intimate pinning force, such as electrostatic pinning force, there is a thin layer of air entrained between the web and the quenching surface. For the purpose of the description of this invention, the word "contact", as it refers to a relationship between a web and a moving quenching surface, means that the web is in proximity with the quenching surface and is separated therefrom by only that thin layer of air. To the extent that the entrained layer of air has a uniform thickness transversely across the web, thermal conductivity between the quenching surface and the web will be substantially uniform. Any air entrained between the web and the quenching surface causing the layer to have a nonuniform thickness, causes nonuniform heat transfer.

For purposes of the description of this invention, the term "pinning" refers to holding a web in actual contact with a quenching surface with forces adequate to prevent lateral movement of the edges of the web despite transverse tension forces generated across the web due to shrinkage when the web is cooled.

According to this invention, there is provided a process for quenching and adjusting the gauge of a molten thermoplastic web which includes extruding the web onto a quenching surface, pinning each lateral edge of the web to the quenching surface, and directing air against the web along the line of initial contact between the web and the quenching surface. At the lateral edges, the air is directed against the web before application of the pinning forces. The air is directed through a plurality of individually adjustable jets and, in one embodiment, the jets are adjusted, at the pinned edges, to have air forces generally decreasing inwardly from the pinning. In central portions of the web, the jets are adjusted to have air forces which are greatest against the relatively thin areas of the web.

DESCRIPTION OF THE INVENTION

FIGS. 4 and 6 are comparative graphical, representations of film thickness, as cast, across webs of thermoplastic material made using the device of FIG. 3 with and without the process of this invention.

FIG. 5 is a comparative, graphical, representation of the film thickness of the webs depicted in FIG. 4 after biaxial orientation.

Figure 1:
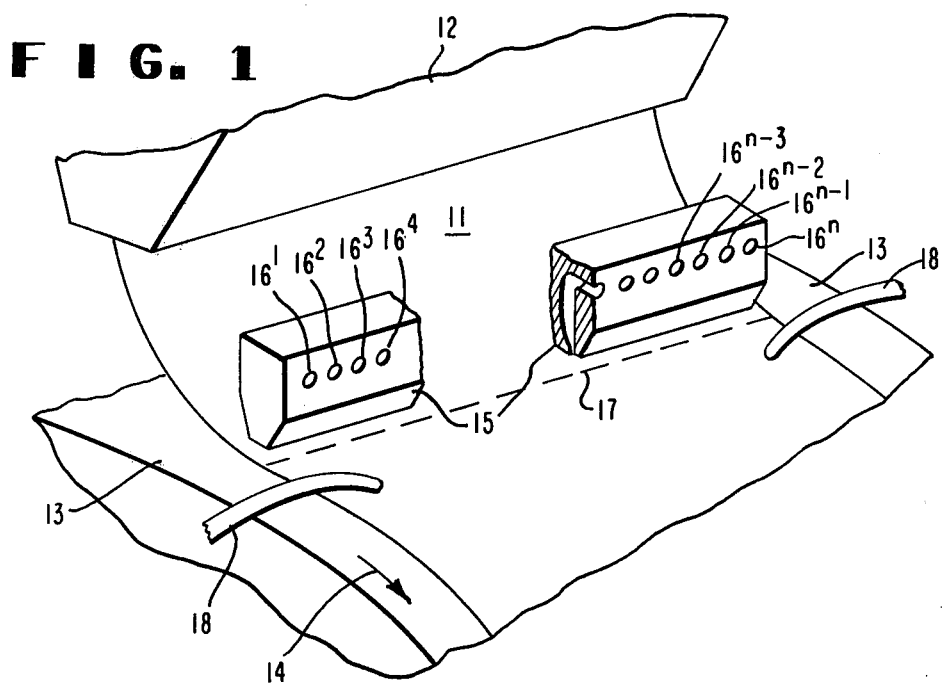
FIG. 1 is a representation of a device used to practice this invention.

In FIG. 1, molten thermoplastic web 11 is extruded from extrusion die 12 to quenching surface 13 moving in the direction of arrow 14. Air jet pack 15 is mounted above quenching surface 13 (the mounting is conventional and not shown). Air is introduced into air jet pack 15 through individual ports $16^1$, $16^2$, $16^3$, ..., $16^n$ from separate air sources capable of individual air pressure adjustment. Air is directed from air jet pack 15 against web 11 along the line 17 of initial contact between web 11 and quenching surface 13. After web 11 has been subjected to the air forces of air jet pack 15 and before the web has built substantial shrinkage forces, lateral edges of the web are pinned by electrostatic probes 18. For purposes of this description, ports $16^1$ and $16^2$ and $16^n$ and $16^{n-1}$, representing lateral edge widths of about 2 centimeters, are located directly over the portion of web 11 which would be pinned by probes 18.

In operation of the process of this invention, the air jet pack provides air forces against the molten web to accomplish web gauge adjustment in at least two ways. First, in the vicinity of the electrostatically pinned edges, the air ports are located to direct air against the web before application of the pinning forces and they are adjusted such that air forces against the web are greatest where the web will be pinned and are generally decreased inwardly from that site. Such adjustment of air forces provides that molten thermoplastic material adjacent to the electrostatic pinning is forced closer to the quenching surface in a way which will cause more rapid web cooling nearest to the area where the edges will be pinned. More rapid web cooling nearest to the area where the edges will be pinned mitigates excessive stretching and consequent thinning at the edges which would be caused by shrinkage in cooling. Air forces applied in the vicinity of where the edges will be pinned generally extend inward to about the points in the web adjacent the pinned edges whereat minimum web thicknesses would occur in the absence of the air forces—a distance of, generally, 2 to 15 centimeters and usually of about 5 centimeters.

Second, in the vicinity of the center of the web between the lateral edges in cases wherein the web may have been cast with local relatively thick or thin areas, the air ports are adjusted to provide air forces which are greatest in areas of the web which are relatively thin. That adjustment creates nonuniformity in the entrained air layer, causes more rapid cooling of relatively thin web areas and leaves relatively thick web areas at a higher temperature and more likely to be stretched during the shrinkage in cooling. The vicinity of the center of the web is generally taken to be the remainder of the web inward from the vicinity of where the edges will be pinned—a distance of, generally, 2 to 15 centimeters, and usually about 5 centimeters.

When the edges of the web are pinned to the quenched surface, some air from beneath the pinned edges is displaced to a position adjacent the pinned edges. This results in a relatively thicker air layer adjacent the pinning and, by the mechanism described above, results in excessive thinning. The air jet pack can be located such that one or more of the air jets are positioned over that portion of the web which will be pinned to the quenching surface. When air forces are directed against the web areas to be pinned, some of the air between the web and the quenching surface is eliminated and, as a result, when the web edge is pinned, less air is displaced under the web adjacent the pinning. In this way, the air layer is more uniform and heat transfer is more uniform.

The width of web which is affected by application of electrostatic pinning forces is usually about 2 to 3 centimeters. Air jets directed toward that affected width of pinned web are said to be directly over the pinning. The outermost air jets adjusted to provide air forces furthest from the central portion of the web are said to be directed at the lateral edges.

With reference to FIG. 1, the gauge adjustment air forces are usually greatest for $16^2$ and $16^{n-1}$ and usually gradually decrease inwardly from each edge through $16^3$, $16^4$, and so forth and $16^{n-2}$, $16^{n-3}$, and so forth, to a position immediately above the area of the web which would exhibit a minimum thickness in the absence of the air forces. Air forces from $16^1$ and $16^n$ are often adjusted to be less than forces inward and adjacent to the pinning. Adjustment of other air forces is made such that relatively greater forces are directed toward relatively thinner web areas. The relatively thinner web areas occur as a matter of normal thermoplastic web manufacture, often as a result of some local deviation in the opening of the extrusion die. Thickness variations in web manufacture can be detected by any of several well-known methods, such as by noncontacting radiation gauges or mechanical thickness measuring devices.

The web thickness can be continuously monitored by noncontacting means and indications of thickness deviations can be used to automatically control and adjust air forces directed toward the web to cause correction in the deviations. Of course, the deviations can also be determined manually and the air forces can be manually adjusted accordingly.

Figure 2:
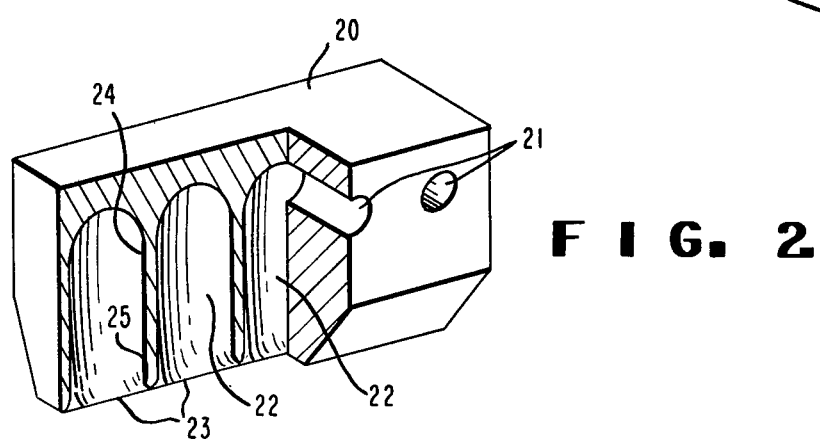
FIG. 2 is a cross-sectional representation of the air jets used in this invention.

In FIG. 2 there is shown a four-part air jet pack 20 in partial cut-away to illustrate the interior of the device. Air is introduced into the jet pack through ports 21 from individually adjustable air pressure sources which are conventional and, therefore, not shown. The air passes through ports 21 into individual chambers 22 and is then directed through slit openings 23 in the side of the pack which, in operation, faces the thermoplastic web. Chambers 22 are individually separated by walls 24 and, at the slit end, walls 24 have beveled edges 25 to afford a continuum of air forces between neighboring slit openings 23. Of course, air jet pack 20 can have as few or as many individually adjustable air jets as are required or desired for a particular use. As few as one jet at each lateral edge provides some of the benefit of the present invention but at least four at each edge are preferred, and six to eight are usually used. The air jet packs can extend across the complete width of a web; and, for adjustment of gauge, it has been found that the slits should not be more than about 5 centimeters long and usually not more than 2 centimeters long. The slits can be as short as desired but, because air is supplied to each slit from an individually controlled air supply, the shortness of the slits becomes a matter of economics and convenience of operation. For that reason, slits are generally not less than about 0.5 centimeters long.

The air jet pack should be located at a distance from the web to avoid contact with the web during operation and yet to maintain coherent and individual air forces from each port against the web. The jet pack is usually located about 3-6 millimeters from the cast web.

Figure 3:
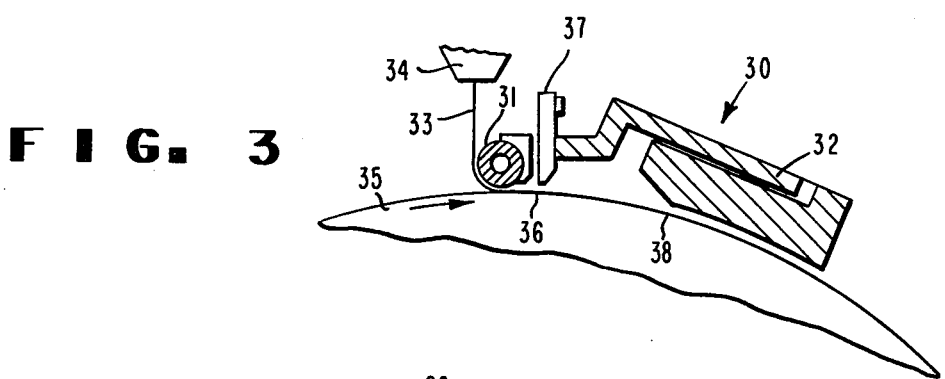
FIG. 3 is a cross-sectional representation of the device with which the process of this invention is preferably practiced.

In FIG. 3 there is shown, in cross section, a preferred device for practice of the present invention. The device 30 comprises a combination of particular web manufacturing elements as previously disclosed in U.S. Pat. No. 4,017,575 issued Apr. 12, 1977 on the application of Heyer, the same inventor as herein. Air bearing 31 is used with pressure chamber 32 and the air forces of the present invention are applied therebetween and before application of pinning forces. In operation, web 33 is cast from extrusion die 34 and is then forced out of a catenary path by air bearing 31 and, thereafter, pressed into proximity with quenching surface 35 moving as indicated.

The molten web is held taut by and stretched around air bearing 31 but does not come into close proximity with quenching surface 35 across the web until it reaches point 36. At point 36, air is directed toward the web from air jet pack 37 as has been disclosed. Subsequent to the air forces of air jet pack 37, the pressure chamber 32 provides a constant air pressure against the web on the quenching surface from air bearing 31 to point 38 and across the entire web. To assure that lateral edges of web 33 are fixed to quenching surface 35, electrostatic pinning forces are applied thereto immediately after the air jet pack 37.

In the practice of this invention, it is necessary that the air forces of the air jet pack must be directed toward the web at or near to the point where the web makes initial contact with the quenching surface to avoid entrainment of excess air and to provide an air layer of desired thickness between the web and the quenching surface.

In FIG. 4 there is shown a graphical comparison of cast web thickness profiles with and without the process of this invention. The abscissa represents distance, in centimeters, from the lateral edges of a cast film web and the ordinate represents thickness of the cast web. Line 41 represents the thickness profile of a quenched web cast using the device of FIG. 3 without air pressure supplied to the air jet pack. To make the webs characterized by the lines of this FIG. 4, polyethylene terephthalate was cast at a temperature of about 285° C. onto a quenching surface moving at about 35 meters per minute and having a surface temperature of about 25° C. The pressure to the air bearing was about 30 kPa and there was a uniform plenum pressure of about 25 Pa. The nominal thickness of the web was 178 micrometers. The web was subjected to electrostatic pinning at about 10 millimeters inward from each lateral edge (indicated at 42) and it is noted that, from the edges to about 2-3 centimeters inward, the web thickness is considerably greater than the nominal thickness. The thickened edges 43 are intended and are necessary to provide material for gripping by web handling devices subsequently in film manufacturing procedures. In line 41 the extreme thinness 44 which occurs immediately inward from the thickened edges and which is followed by another thickened area 45 are characteristic of webs made without use of the present invention, and are especially noted.

Line 46 represents the thickness profile of a quenched web cast using the same device as above under the same conditions with the exception that, near each lateral edge air jet packs were positioned such that the first of eight slits 9.5 millimeters long was at the edge of the web. The slits were directly adjacent one another and were 0.75 millimeters wide. Air pressures at the slits in each air jet pack were adjusted such that the velocity of air from the individual jets was as is indicated in FIG. 4 and the slits were positioned to be 3.8 millimeters from the cast web. Air velocities from jets over the sites of electrostatic pinning (jets L1, L2, L3, R1, R2, and R3) were adjusted to be generally greater than jets inward from the pinning. Exact adjustment of the jets cannot be predetermined for any given situation. The web thickness profile is inspected and the jets are adjusted in accordance with the teaching herein.

Line 46 evidences a cast web of regularly thinning profile without thickness reversals. It is noted that line 46 does not indicate either an area of extreme thinness or a thickened area inward therefrom as were represented by 44 and 45, respectively, in line 41.

A cast web of the improved thickness profile of line 46 is the result of this invention and the result is even more pronounced in FIG. 5 where is shown a graphical comparison of the cast webs of FIG. 4 after being subjected to biaxial orientation by being stretched 3.4× in the machine direction and 4.3× in the transverse direction to yield a film with a nominal thickness of 12 micrometers. In FIG. 5, line 51 represents the oriented film product of cast web 41 in FIG. 4 and line 52 represents the oriented film product of cast web 46 in FIG. 4. It is noted that the thickness of the film of line 51 deviates substantially from the nominal 12 micrometers thickness for a distance 10-13 centimeters inward from one edge and a distance of 15-18 centimeters inward from the other edge for a total of about 25-31 centimeters of scrap. Such deviations represent considerable waste in film which must be scrapped for being outside of acceptable thickness limits. On the other hand, the thickness of the film of line 52 directly approaches the nominal thickness and stays there with a total of less than 13 centimeters of scrap.

Figure 6:
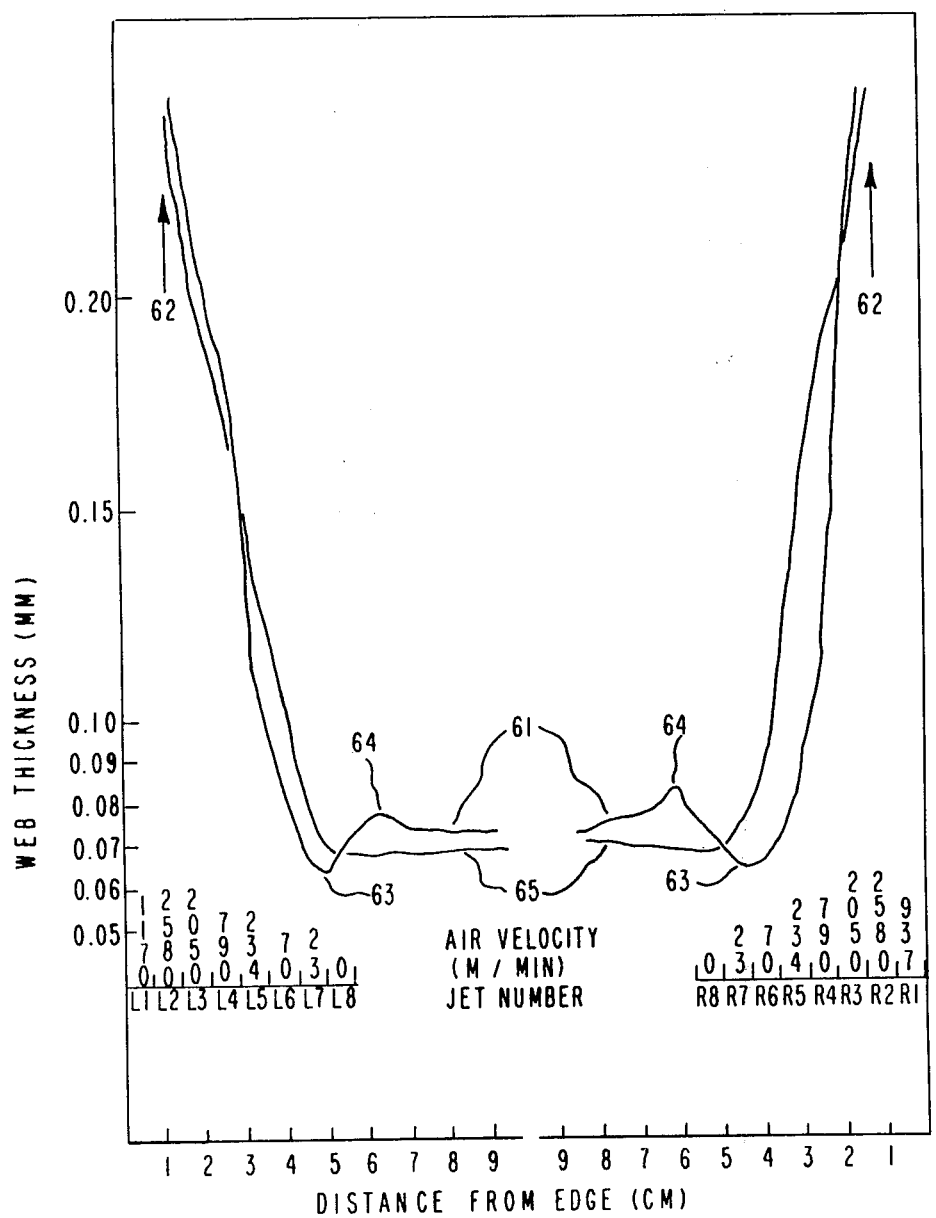

In FIG. 6 there is shown a graphical comparison of thickness profiles of another cast web with and without the process of this invention. Line 61 represents the thickness profile of the quenched web cast using the device of FIG. 3 without air pressure supplied to the air jet pack. To make the webs characterized by the lines of this FIG. 6, polyethylene terephthalate was cast at a temperature of about 285° C. onto a quenching surface moving at about 85 meters per minute and having a surface temperature of about 16° C. The pressure to the air bearing was about 69 kPa and there was a uniform plenum pressure of about 22 pa. The nominal thickness of the cast web was 64 micrometers. The web was subjected to electrostatic pinning at about 10 millimeters inward from each lateral edge (indicated at 62) and it is noted that, from the edges to about 4-5 centimeters inward, the web thickness is considerably greater than the nominal thickness.

In line 61 the thickness minima 63 and the inward maxima 64 are noted as gauge deviations to be adjusted by the process of this invention.

Line 65 represents the thickness profile of a quenched web cast using the same device as above under the same conditions with the exception that, near each lateral edge, air jet packs were positioned such that the first of eight slits 6.5 millimeters long was at the edge of the web. The slits were directly adjacent one another and were 0.75 millimeters wide. Air pressures at the slits in each air jet pack were adjusted such that air from the individual jets was as is indicated in FIG. 6 and the slits were positioned to be 4.3 millimeters from the cast web. Air velocities from jets over the sites of pinning were adjusted to be greater than jets inward from the pinning and air velocities from the jets at the lateral edges, L1 and R1, were adjusted to be less than air velocities from jets directly over the pinning, L2 and R2. Air velocities from jets adjacent to the pinning were adjusted to decrease inwardly from the pinning.

Line 65 evidences a cast web of regularly thinning profile without the maxima and minima of line 61.

The optimum pressures to the air jet packs useful for practicing this invention vary greatly with changes in kind and character of the thermoplastic material and changes in conditions of casting and stretching. The above teaching is of the best mode presently contemplated for practicing the invention and for changed materials or conditions, air pressures and other process conditions can be altered to provide gauge adjustment by simple inspection of web thickness profiles followed by adjustment of air pressure in accordance with the teaching disclosed herein.

While this invention can be used in the manufacture of any thermoplastic cast web in accordance with the teaching herein, the invention is best suited for use in manufacture of cast webs of: polyolefins such as polyethylene and polypropylene; polyamides such as polyhexamethylene adipamide and polycaproamide; vinylidene chloride; and polyesters such as polyethylene-2,6-naphthalate and polytetramethylene-1,2-dioxybenzoate and is especially useful with polyethylene terephthalate.

I claim:

1. In a process for quenching and adjusting the gauge of molten thermoplastic web which includes extruding the web onto a quenching surface and pinning each lateral edge of the web to the quenching surface, the improvement which comprises, directing air through a plurality of air jets and against the web before the pinning and along the line of initial contact between the web and the quenching surface, and adjusting the air being directed against the web to provide air in the vicinity of each pinned edge such that air forces against the web are greatest where the web will be pinned and are decreased inwardly from that site.

2. The process of claim 1 wherein the air jets in the vicinity of the center of the web between the lateral edges are adjusted to provide air such that air forces against the web in that vicinity are greatest in areas of the web which are relatively thin.

3. The process of claim 2 wherein the vicinity of the pinned edges is that area inward from each lateral edge to points in the web adjacent the pinned edges whereat minimum web thicknesses would occur in the absence of the air forces and the vicinity of the center of the web between the lateral edges is the remainder of the web inward from the vicinity of the pinned edges.

4. The process of claim 3 wherein the vicinity of the pinned edges is about 2 to 15 centimeters inward from each lateral edge.

5. The process of claim 1 wherein air is directed against the web along the complete line of initial contact between the web and the quenching surface.

6. The process of claim 5 wherein the air jets are adjusted to provide air in the vicinity of the pinned edges before the pinning such that air forces against the web are greatest where the web will be pinned and are decreased inwardly from that site.

7. The process of claim 5 wherein the air jets in the vicinity of the center of the web between the lateral edges are adjusted to provide air such that air forces against the web in that vicinity are greatest in areas of the web which are relatively thin.

8. The process of claim 1 wherein the air is directed against the web along the line of initial contact between the web and the quenching surface, before the pinning, and to points in the web adjacent the pinned edges whereat minimum web thicknesses would occur in the absence of air forces.

* * * * *